US006542897B2

(12) United States Patent
Lee

(10) Patent No.: US 6,542,897 B2
(45) Date of Patent: *Apr. 1, 2003

(54) CUSTOMER SUPPORT SYSTEM USING INTERNET

(75) Inventor: Kang-dong Lee, Suwon (KR)

(73) Assignee: Samsung Electronics Co., Ltd., Suwon (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/079,305

(22) Filed: May 15, 1998

(65) Prior Publication Data

US 2002/0111950 A1 Aug. 15, 2002

(30) Foreign Application Priority Data

May 15, 1997 (KR) .......................... 1997-18681

(51) Int. Cl.⁷ .............................................. G06F 17/30
(52) U.S. Cl. .............................. 707/102; 707/2; 705/27; 705/28; 705/29; 345/843
(58) Field of Search ....................... 705/27–29; 345/336, 345/843; 707/102, 2

(56) References Cited

U.S. PATENT DOCUMENTS

| | | | |
|---|---|---|---|
| 4,648,062 A | | 3/1987 | Johnson et al. ............. 345/338 |
| 4,964,077 A | | 10/1990 | Eisen et al. ................. 345/337 |
| 5,287,448 A | | 2/1994 | Nicol et al. ................. 345/337 |
| 5,287,505 A | | 2/1994 | Calvert et al. ................ 707/10 |
| 5,388,252 A | | 2/1995 | Dreste et al. ................. 714/46 |
| 5,455,933 A | | 10/1995 | Schieve et al. ............... 714/27 |
| 5,678,002 A | | 10/1997 | Fawcett et al. ............. 345/336 |
| 5,682,510 A | * | 10/1997 | Zimmerman et al. ....... 345/843 |
| 5,694,559 A | | 12/1997 | Hobson et al. ............. 345/336 |
| 5,701,451 A | * | 12/1997 | Rogers et al. ................. 707/1 |
| 5,774,660 A | * | 6/1998 | Brendel et al. ............. 709/100 |
| 5,774,870 A | * | 6/1998 | Storey .......................... 705/14 |
| 5,870,552 A | * | 2/1999 | Dozier et al. ............. 707/501.1 |
| 5,909,023 A | * | 6/1999 | Ono et al. ................... 235/380 |
| 5,918,213 A | * | 6/1999 | Bernard et al. ............... 705/26 |
| 5,918,214 A | * | 6/1999 | Perkowski .................... 705/27 |
| 5,933,599 A | * | 8/1999 | Nolan .................... 395/200.48 |
| 5,950,173 A | * | 9/1999 | Perkowski .................... 705/26 |
| 5,956,483 A | * | 9/1999 | Grate et al. ................. 709/203 |
| 5,974,446 A | * | 10/1999 | Sonnenreich et al. ....... 709/203 |
| 6,023,729 A | * | 2/2000 | Samuel et al. ................ 463/42 |
| 6,029,195 A | * | 2/2000 | Herz .......................... 709/219 |
| 6,141,666 A | * | 10/2000 | Tobin ......................... 707/513 |
| 6,240,420 B1 | * | 5/2001 | Lee ............................. 345/810 |

OTHER PUBLICATIONS

Sony (Sony Computing Products, "Common Solutions/FAQs", 1996, 2 pages).*
Sony (Sony Computing Products, "Solution", 1996, 1 page).*
Sony (Sony Computing Products, "Software Updates", 1996, 2 pages).*
Sony (Sony Computing Products, "PCV–70 Personal Computer", 1996, 4 pages).*
Sony Corporation (Sony Computing Products, http://sony.com/products/pc, 1996).*

* cited by examiner

*Primary Examiner*—Wayne Amsbury
(74) *Attorney, Agent, or Firm*—Robert E. Bushnell, Esq.

(57) ABSTRACT

A customer support system provides a customer support service with respect to a consumer product using an Internet. The customer support system includes a customer support server having a customer support engine for providing the customer support service with respect to a consumer product, and a database for storing product-related information to be used by the customer support engine. The system also includes a user computer including Internet communications means which can be connected to the customer support server through an Internet. The customer support engine of the customer support server includes a gate page, as a homepage of the customer support system, for providing a menu with respect to a predetermined customer support service, and a service page for providing at least a customer support service, including the usage guidance on a product, according to a predetermined menu selected on the gate page. As a result, the number of after service requests from consumers is reduced, and the service cost is minimized while the service quality is enhanced.

28 Claims, 14 Drawing Sheets

Fig. 15

SCROLL BAR

WINDOW NAME

TOOL BAR

FAQ   M550D
      INQUIRY:CD-ROM DRIVE IS NOT RECOGNIZED

CD-ROM RELATED MATTERS

ANSWER  CAUSE 1) IS APPROPRIATE DEVICE DRIVE USED?
        CAUSE 2) CD-ROM DRIVE JUMPER SETTING IS CHECKED?
        CAUSE 3) BIOS SETTING STATE IS CHECKED?

CONTENT MEASURE 1) VERIFY THE KIND OF CD-ROM DRIVE AND
                   DEVICE DRIVE REFERENCE
        MEASURE 2) VERIFY CABLE JUNCTION STATE AND POWER
                   CONNECTION STATE BETWEEN CD-ROM
                   DRIVE AND MAIN BOARD

WINDOW TASK BAR

CUSTOMER SUPPORT SYSTEM USING INTERNET

CLAIM FOR PRIORITY

This application makes reference to, incorporates the same herein, and claims all benefits accruing under 35 U.S.C. §119 from an application for CUSTOMER SUPPORT SYSTEM USING INTERNET earlier filed in the Korean Industrial Property Office on the May 15, 1997, and there duly assigned Serial No. 18681/1997, a copy of which application is annexed hereto.

BACKGROUND OF THE INVENTION

1. Technical Field

The present invention relates to a customer support system, and more particularly, to a customer support system for providing customer support services with respect to a predetermined product using an Internet.

2. Related Art

Generally, when consumer products are purchased by a consumer and are subsequently found to be defective, support service must be provided by a manufacturer to help diagnose the problems of the consumer products. The consumer products may be computer systems, software products and other consumer electronics devices. Traditionally, a service person from a centralized service center must visit the consumer's home to repair or replace the defective products. Such a house-to-house service of consumer products requires extensive networks of service representatives, inventories and physical facilities. Moreover, support service can be very expensive and time consuming process.

A centralized service information system has since established to provide support services to a wide variety of consumer products, particularly computer systems and software products. When a customer experiences problems with a computer system or a software product, the customer typically calls a customer support line and receives assistance from a service representative, usually a customer support engineer. The customer support engineer typically asks the customer questions to help diagnose the customer's problems and offers a proposed diagnosis and instructions to help the customer to remedy the problems. However, this service process is also slow and unsatisfactory both to the customer and the manufacturer.

In an effort to reduce product support costs and improve customer satisfaction, many customer support systems, particularly for computer systems and software products are now available "on-line" as disclosed, for example, in U.S. Pat. No. 4,648,062 for Method For Providing An On-Line Help Facility For Interactive Information Handling Systems issued to Johnson et al., U.S. Pat. No. 4,9964,077 for Method For Automatically Adjusting Help Information Displayed In An On-Line Interactive System issued to Eisen et al., U.S. Pat. No. 5,287,448 for Method And Apparatus For Providing Help Information To Users Of Computers issued to Nicol et al., U.S. Pat. No. 5,287,505 for On-Line Problem Management Of Remote Data Processing Systems, Using Local Problem Determination Procedures And A Centralized Database issued to Calvert et al., U.S. Pat. No. 5,388,252 for System for Transparent Monitoring Of Processors In A Network With Display Of Screen Images At A Remote Station For Diagnosis By Technical Support Personnel issued to Dreste et al., U.S. Pat. No. 5,455,933 for Circuit And Method For Remote Diagnosis Of Personal Computers issued to Schieve et al., U.S. Pat. No. 5,678,002 for System And Method For Providing Automated Customer Support issued to Fawcett et al., and U.S. Pat. No. 5,694,559 for On-Line Help Method And System Utilizing Free Text Query issued to Hobson et al. Generally, on-line documentation is structured like an instruction manual with the choice of index, search, or table-of-contents access to help topics. The customer can search through headings to locate the topic appropriate for the needs of the customer. While these "on-line" help systems advance the market quality of customer products, I believe that an improved customer service system can be installed using the popularity of Internet to ensure high level of customer satisfaction and minimize after-service cost.

SUMMARY OF THE INVENTION

Accordingly, it is therefore an object of the present invention to provide a customer support system for providing customer support services with respect to consumer products using an Internet.

It is also an object to provide a customer support system for providing customer support services using an Internet to reduce the number of after service requests from consumer products and to enhance the service quality of the consumer products while saving after-service costs.

These and other objects of the present invention can be achieved by a customer support system for providing customer support services with respect to a consumer products using an Internet. The customer support system may be constructed with a customer support server including a customer support engine for providing customer support services with respect to the consumer product, and a database for storing product-related support information to be used by the customer support engine; and a user computer including Internet communications device which can be connected to the customer support server through an Internet for access to the product-related support information.

The customer support engine of the customer support server may have a gate page, as a homepage of the customer support system, for providing a menu with respect to a specific client support service; and a service page for providing at least the specific client support service, including the usage guidance on a consumer product, according to a predetermined menu selected on the gate page.

The gate page may be configured with a Window name window; a tool bar window for providing a menu where an operation tool with respect to a Windows can be selected; an operation window for providing a menu with respect to at least a client support service; a screen scroll bar window for scrolling the operation window; and a Window task bar window. The service page is a service menu provided by the gate page as a support page for providing a product model guidance, the usage of various resources related to the consumer product, and technical information relating the consumer product. The service page may also have a download page for downloading a software related to the consumer product to the user computer via the Internet.

The support page may have a model menu screen unit for providing a model menu from which a product model that a user is using or desires to learn about can be selected; a specification screen unit for providing a detailed item menu of the specification of a model selected from the model menu screen and various resources related to the selected model; and a support service unit for providing the usage and technical information with respect to a detailed item selected from the detailed item menu by making access to a database storing information related to the selected product. When the consumer product is a personal computer (PC) a Windows 95 page provides Windows 95-related technical information, and the support service unit includes graphic and text information with respect to the front and rear sides of the main body of the selected PC model, a main board of the selected PC model, and a switch setting of the selected PC model.

The download page may have a model menu screen unit providing a model menu from which a product model that a user uses or wants to know can be selected; a detailed item menu output unit displaying a detailed item menu including various utilities, various drivers and bundled software which are required for a model selected on the model menu screen; and a download service unit accommodating downloading a program corresponding to a detailed item selected from the detailed item menu to the user computer via the Internet.

The service page further comprises a frequently asked question page (i.e., a FAQ page) for prewriting the answers to questions that a user frequently raises and notifying of the prepared answers; and a Windows 95 page for providing Windows 95-related technical information.

The service page has a movement menu for a direct movement between service pages if the service page is comprised of at least two service pages.

The frequently asked question page (i.e., a FAQ page) may have a model menu screen unit for providing a model menu from which the model of a product that the user is currently using or desires to learn about can be selected; a detailed item menu output unit for classifying disorders or questions felt by a user during use of a product into detailed items by models and displaying the classified detailed items, when a model is selected on the model menu screen; an inquiry content menu output unit for displaying a menu consisting of prepared inquiry contents with respect to a detailed item selected from the detailed item menu; and a question and answer service unit for providing information on answers and measures corresponding to a question selected from the inquiry content menu.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein:

FIG. 14 illustrates a detailed item menu screen for displaying a detailed item menu where disorders or questions raised by a user during the use of the selected model are divided into detailed items; and FIG. 15 illustrates a screen for displaying an example of questions and answers with respect to the selected FAQ (frequently asked question).

DETAILED DESCRIPTION OF THE PREFERRED EMBODIMENT

Figure 1:
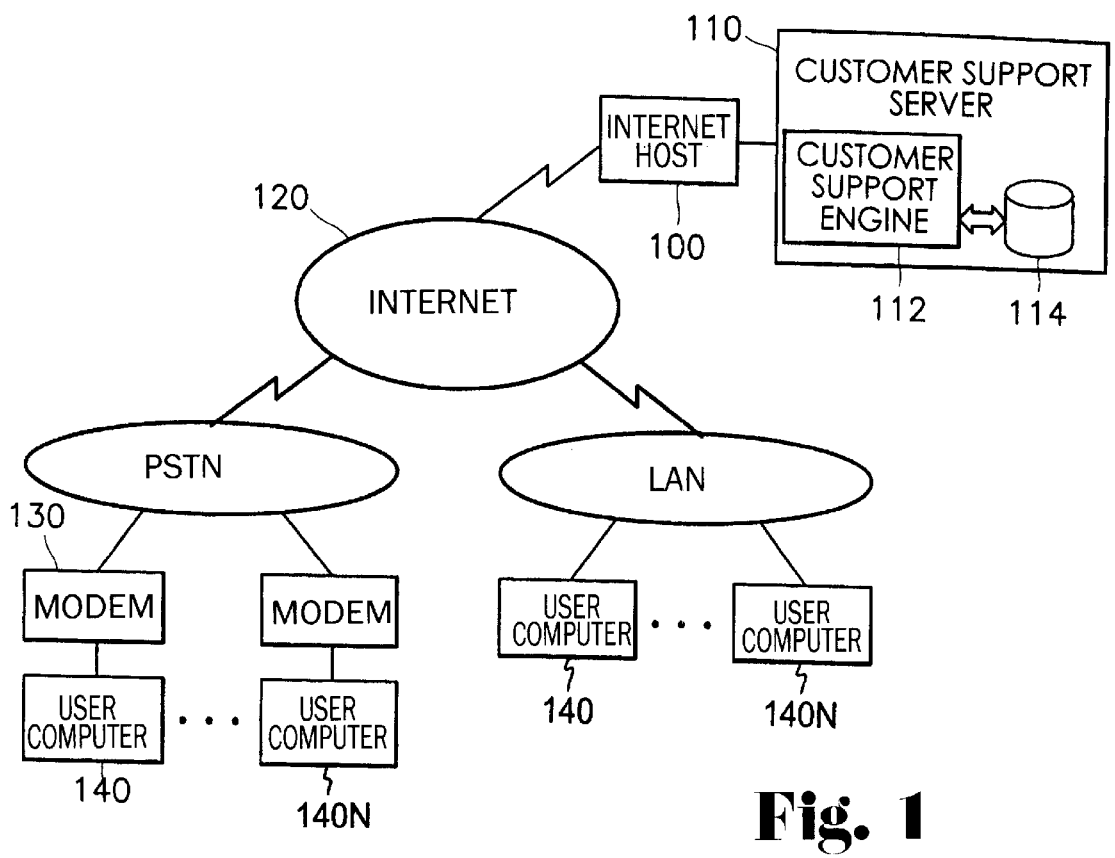
FIG. 1 illustrates a configuration of a client support system using an Internet according to the principles of the present invention.

Referring now to the drawings, FIG. 1, illustrates a configuration of a customer support system for providing customer support services using an Internet according to the principles of the present invention. The customer support system includes a customer support server 110 connected to an Internet 120 via an Internet host 100, and user computers 140 which are either connected to a public switched telephone network (PSTN) to contact the customer support server 110 via the Internet 120 using an Internet connection device such as a modem 130, or connected to a local area network (LAN) to contact the customer support server 110 directly via the Internet 120.

The user computers 140 can be connected to the Internet 120 using a typical Internet connection device, such as a modem 130 a leased line, etc. The user computers 140 are customers with personal computers (PCs) who seek assistance from after service (AS) from a service center by connecting to the customer support server via the Internet 120.

Figure 2:
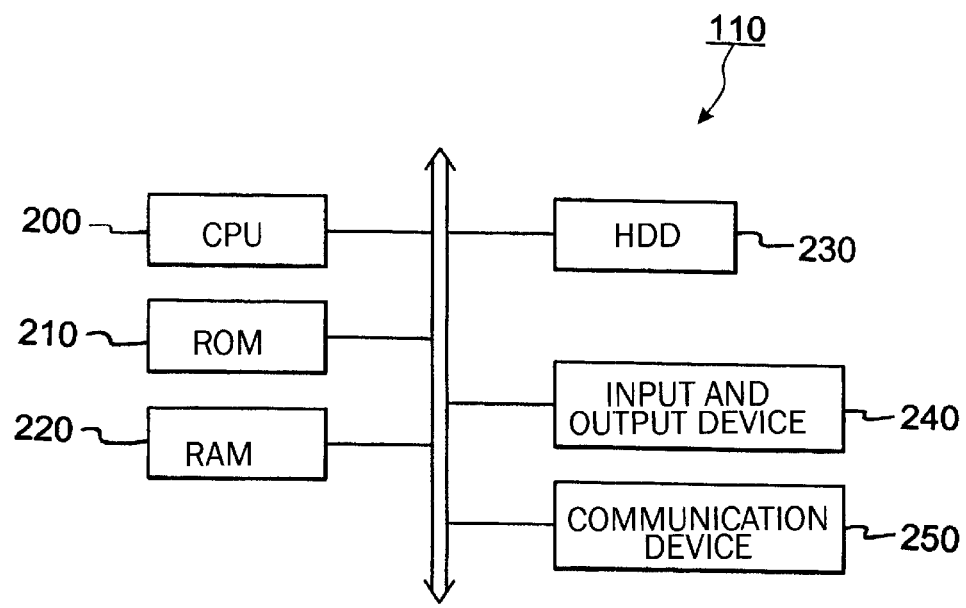
FIG. 2 illustrates a configuration of a user computer for use as a customer support server.

FIG. 2 illustrates a typical computer system used as the customer support server 110 of the customer support system as shown in FIG. 1. The computer system typically includes a central processing unit (CPU) 200, a read-only-memory (ROM) 210, a random-access-memory (RAM) 220, a hard disk drive (HDD) 230, an input and output device 240, and a communication device 250. When the computer system is configured as a customer support server 110, the computer system also contains a customer support engine 112 for providing customer support services with respect to a predetermined product such as a personal computer (PC), and a database 114 for storing PC-related information that the customer support engine 112 requires. The customer support engine 112 is a software for customer support, and as shown in FIG. 3, is comprised of a gate page 300 corresponding to a homepage, a support page 310, a download page 320, a FAQ (frequently asked question) page 330 and a Windows 95 page 340.

Figure 4:
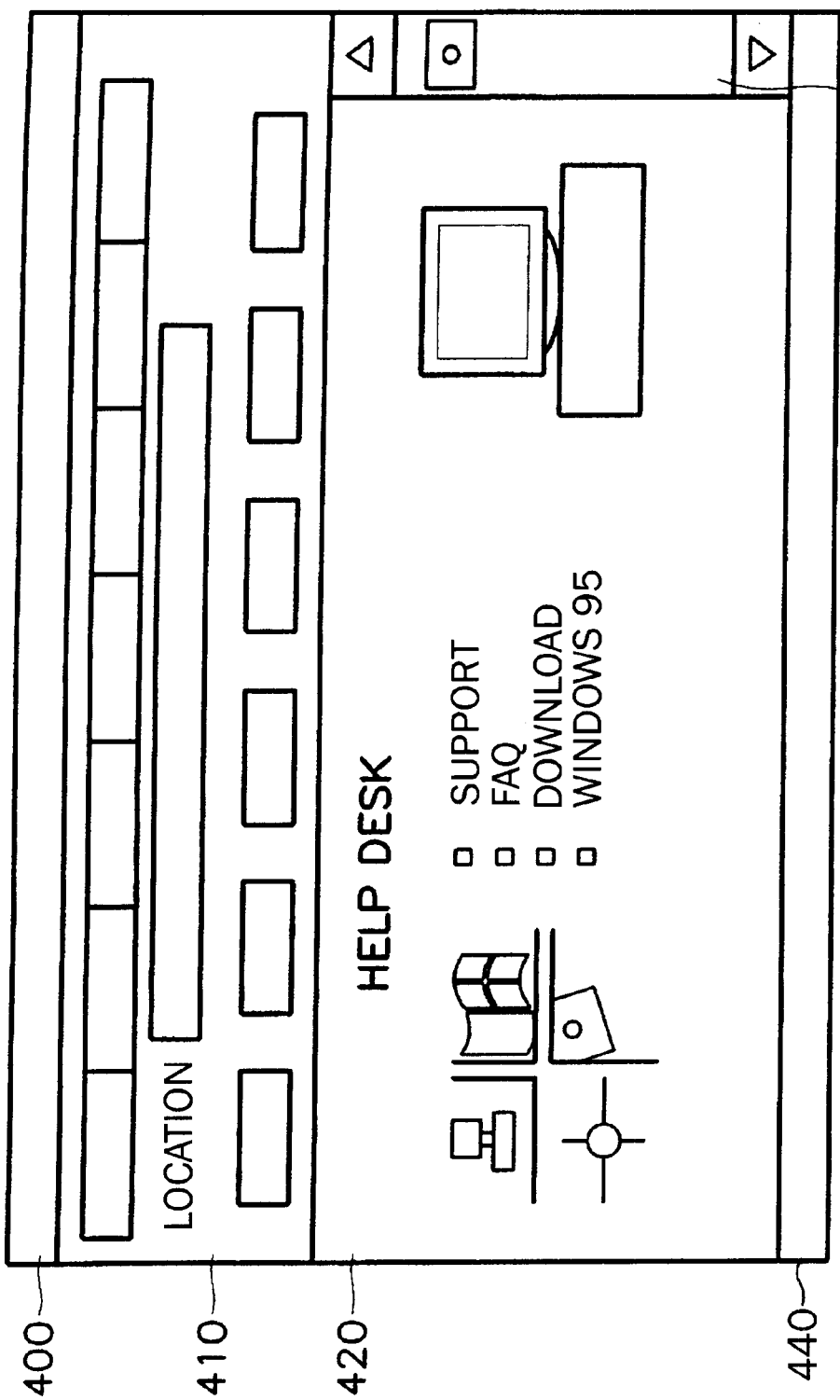
FIG. 4 illustrates a window configuration of a gate page.

The gate page 300, as a homepage of the customer support engine 112, supplies a menu of services to be provided to customers. As shown in FIG. 4, the gate page 300 includes a Window's name window 400 for showing the name of a Window, a tool bar window 410 for supplying a menu from which operation tools with respect to the Window can be selected, an operation window 420 for supplying at least a menu on the customer support services, a screen scroll bar window 430 for scrolling the above-described operation windows, and a Window task bar window 440.

Figure 3:
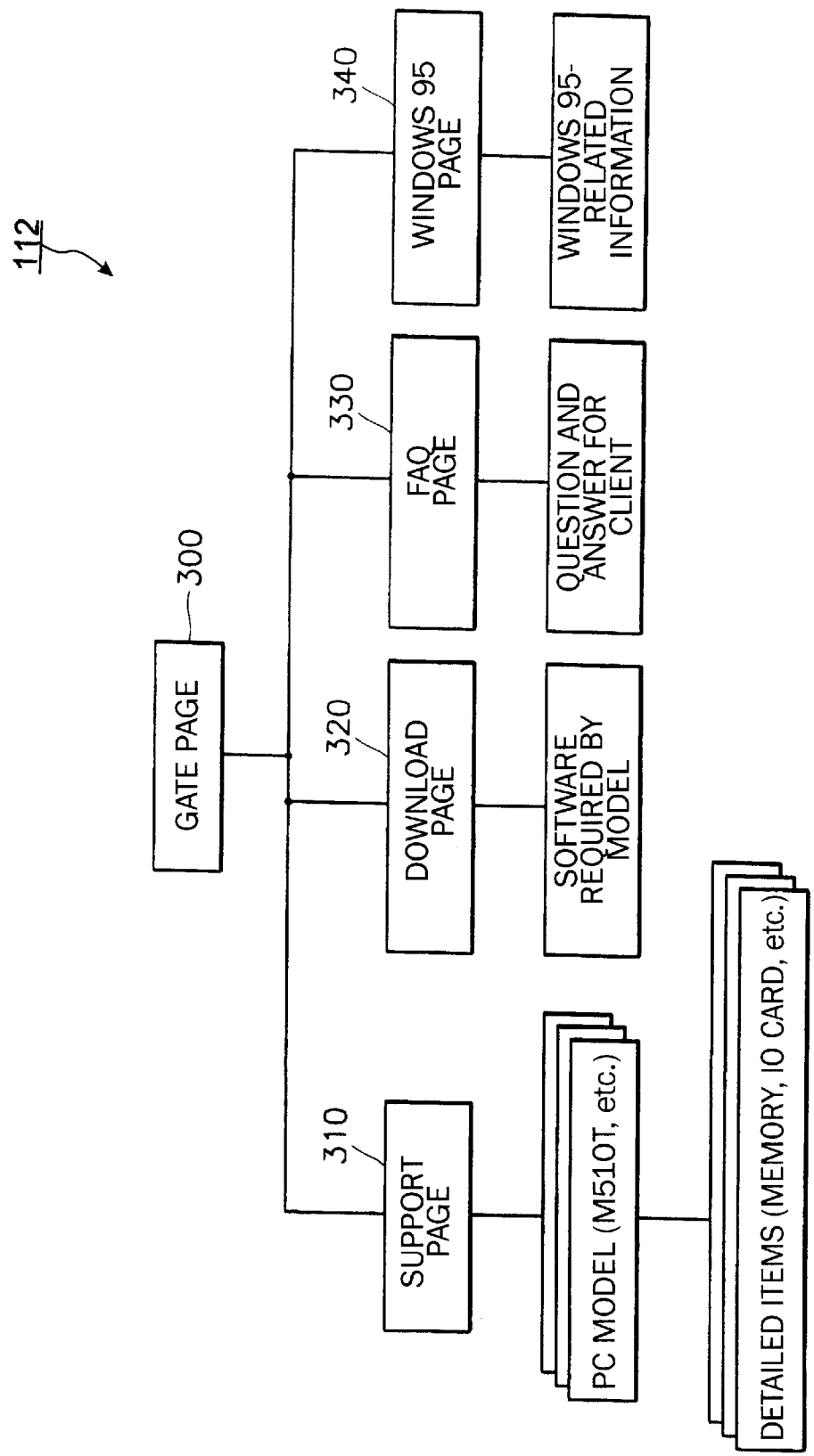
FIG. 3 illustrates function blocks of a client support engine.
Figure 5:
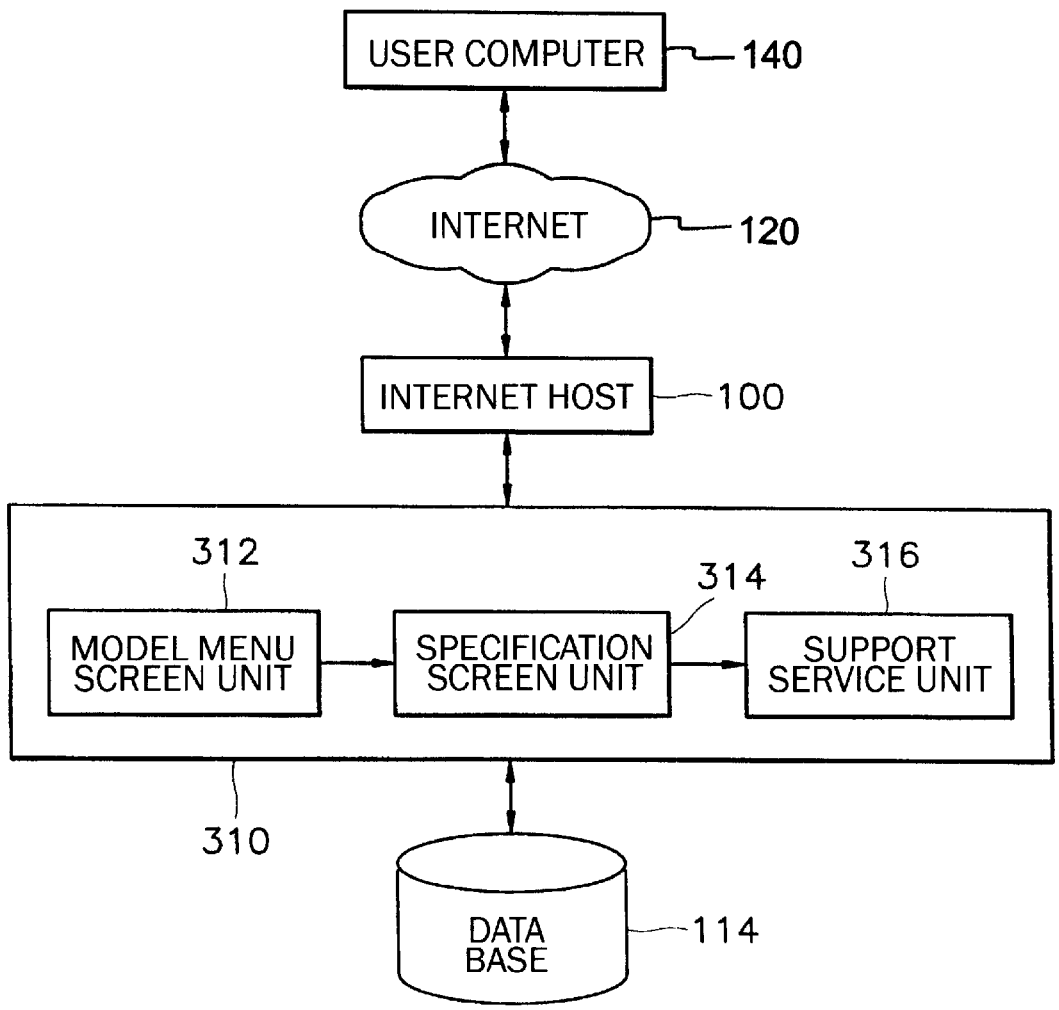
FIG. 5 illustrates a configuration of a usage guide page.

The support page 310 of FIG. 3 is a module for providing PC model guidance, the usage of various PC-related resources, and technical support information. As shown in FIG. 5, the support page 310 is comprised of a model menu screen unit 312 for providing a model menu from which a model can be selected, a specification screen unit 314 for providing a specification and detailed item menu with respect to a model selected by the user, and a support service unit 316 for providing the usage and technical materials with respect to a selected resource to the customer support server 110 by making an access to the database 114 storing the PC-related information after a detailed item is selected.

Figure 6:
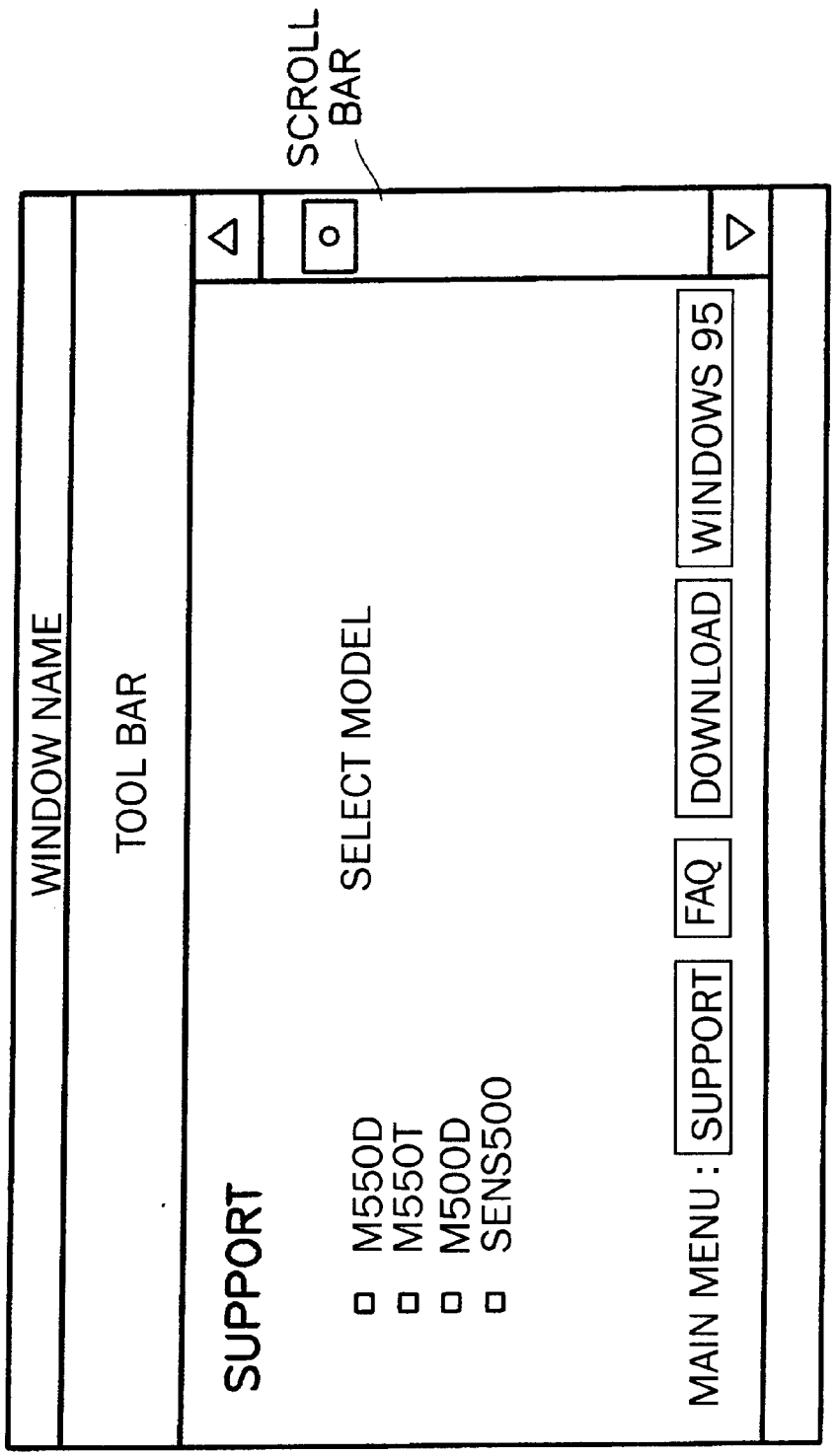
FIG. 6 illustrates a model menu screen for displaying a menu on the model name of a PC which a user currently uses or desires to learn about on the support page.
Figure 7:
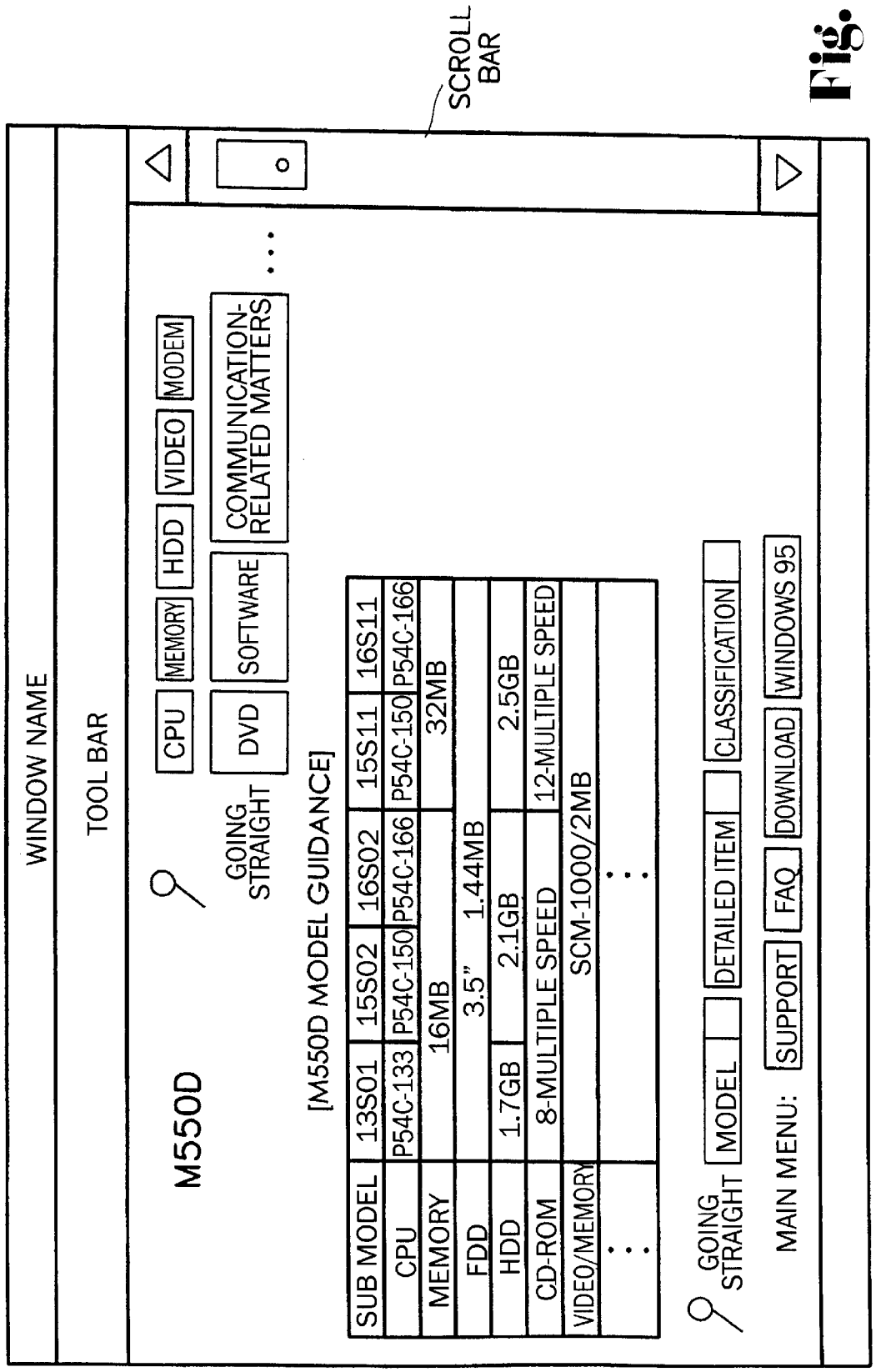
FIG. 7 illustrates a specification and detailed item menu screen for displaying a specification on a selected model and a detailed item menu having various resources associated with the selected model.
Figure 8:
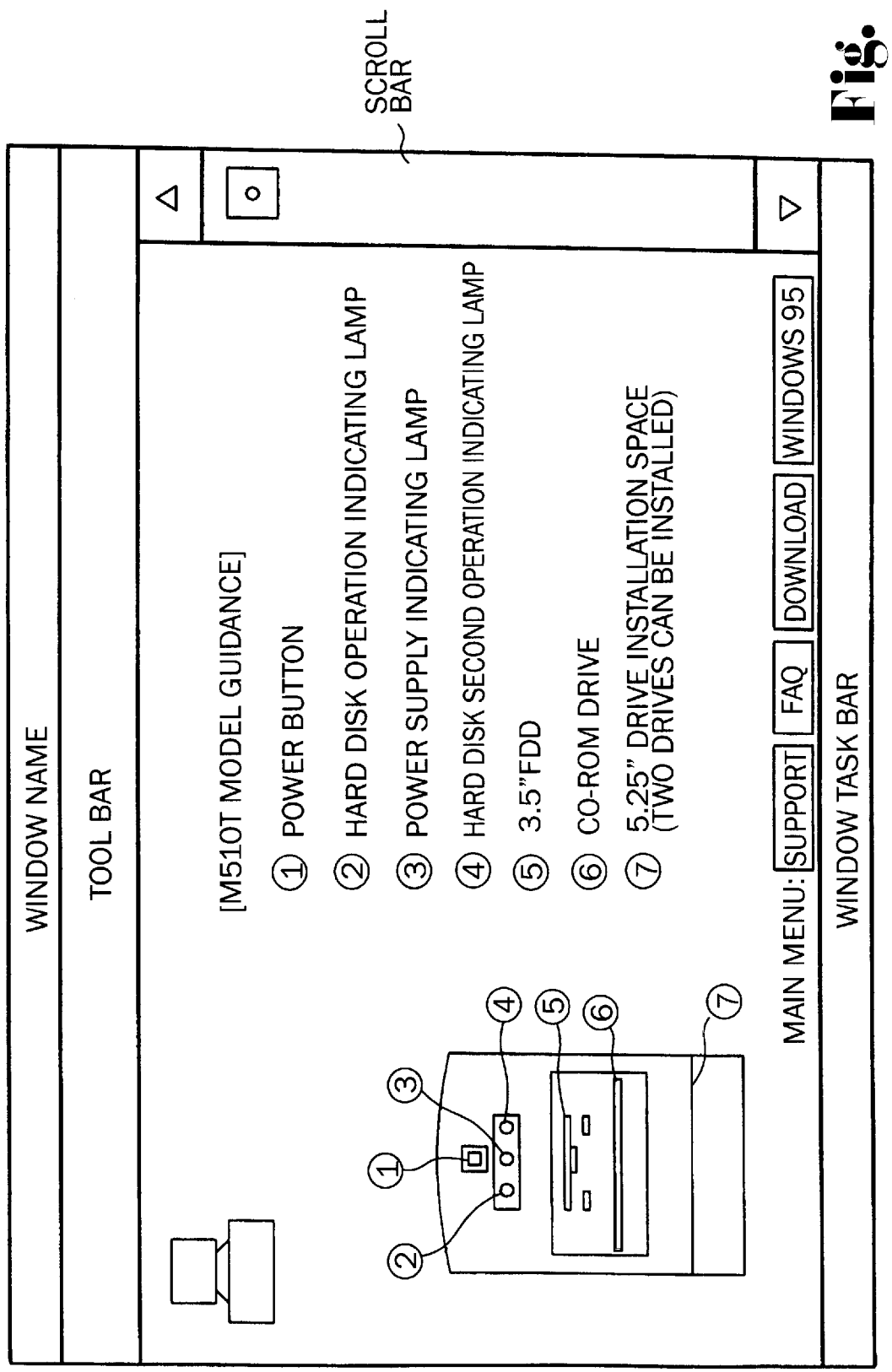
FIG. 8 illustrates an example of a screen on which information on the front side of a system main body is provided as graphic and text information by a support service unit.

FIG. 6 illustrates a model menu screen for displaying a menu on the model name of a PC which is being used by a user or the PC the user desires to learn about on the support page 310. FIG. 7 illustrates a specification and detailed item menu screen for displaying a specification on a selected model and a detailed item menu where a user can select various resources relating to the selected model, once a model is selected from the model menu on the model menu screen. The support service unit 316 provides the system appearance of the selected PC model, hardware resources, and the technical information on software as graphic and text information. Here, the system appearance includes the front and rear sides of the main body of the selected PC model, a periodic board thereof, and a switching setting thereof. Hardware resources of the selected PC model are a CPU, a memory, a video/audio card, a CD-ROM, an HDD, a modem, communication-related matters, a software collection, etc. FIG. 8 provides an example of a screen on which the information on the front side of the main system is displayed as graphic and text information by the support service unit 316.

Figure 9:
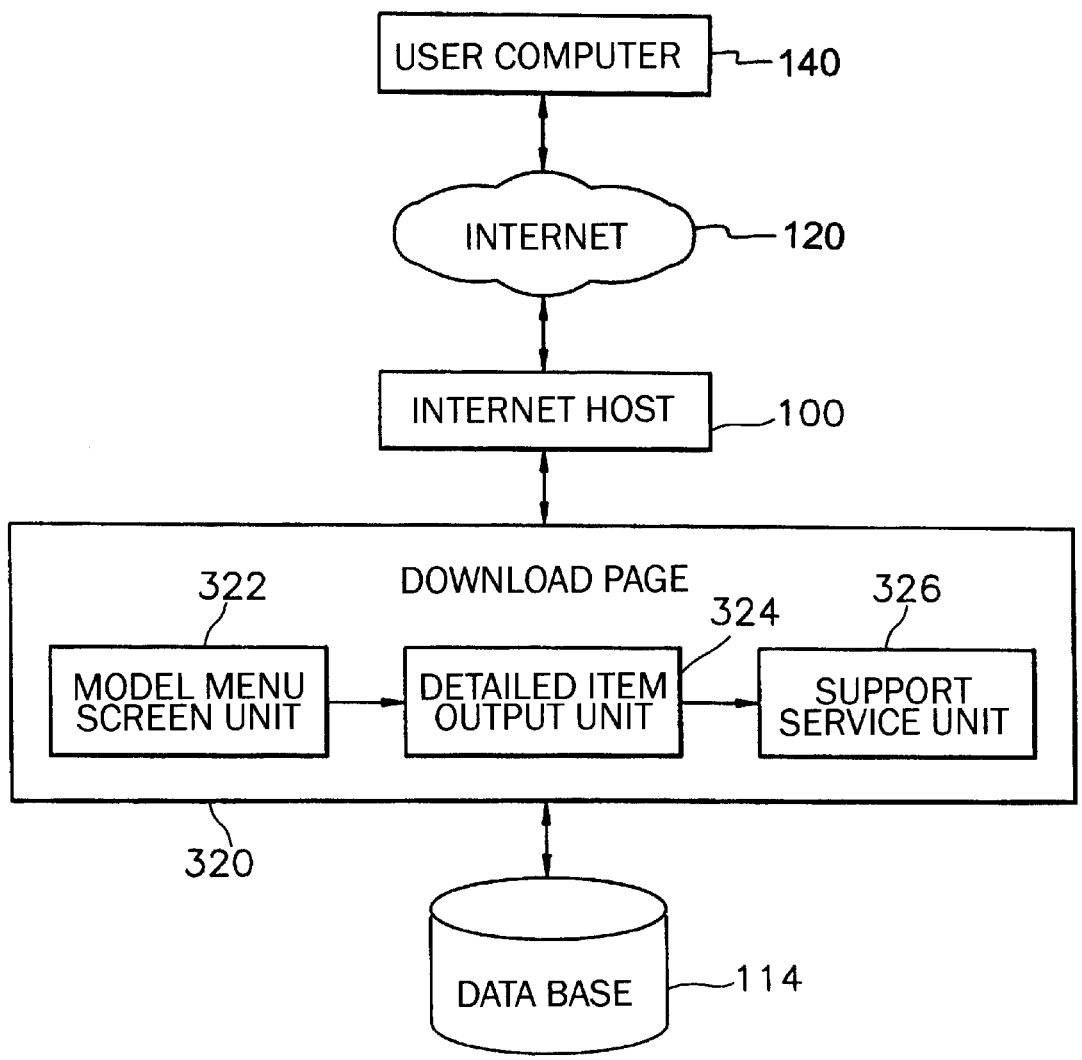
FIG. 9 illustrates a configuration of a download page.

The download page 320 of FIG. 3 is a module for downloading PC-related software desired by the user to a user computer 140 when the user experiences a particular program during use of a PC, when the version of software currently being used is to be upgraded, or when new application software is desired to be installed. As shown in FIG. 9, the download page 320 includes a model menu screen unit 322 for providing a model menu from which a user can select a product model that the user is currently using or desires to learn about, a detailed item menu output unit 324 for providing a detailed item menu consisting of various utilities, various drivers and bundled software required for a model selected on the model menu screen, and a download to the user computer 140 via Internet 120 service unit 326 for downloading a program corresponding to a detailed item selected from the detailed item menu.

Figure 10:
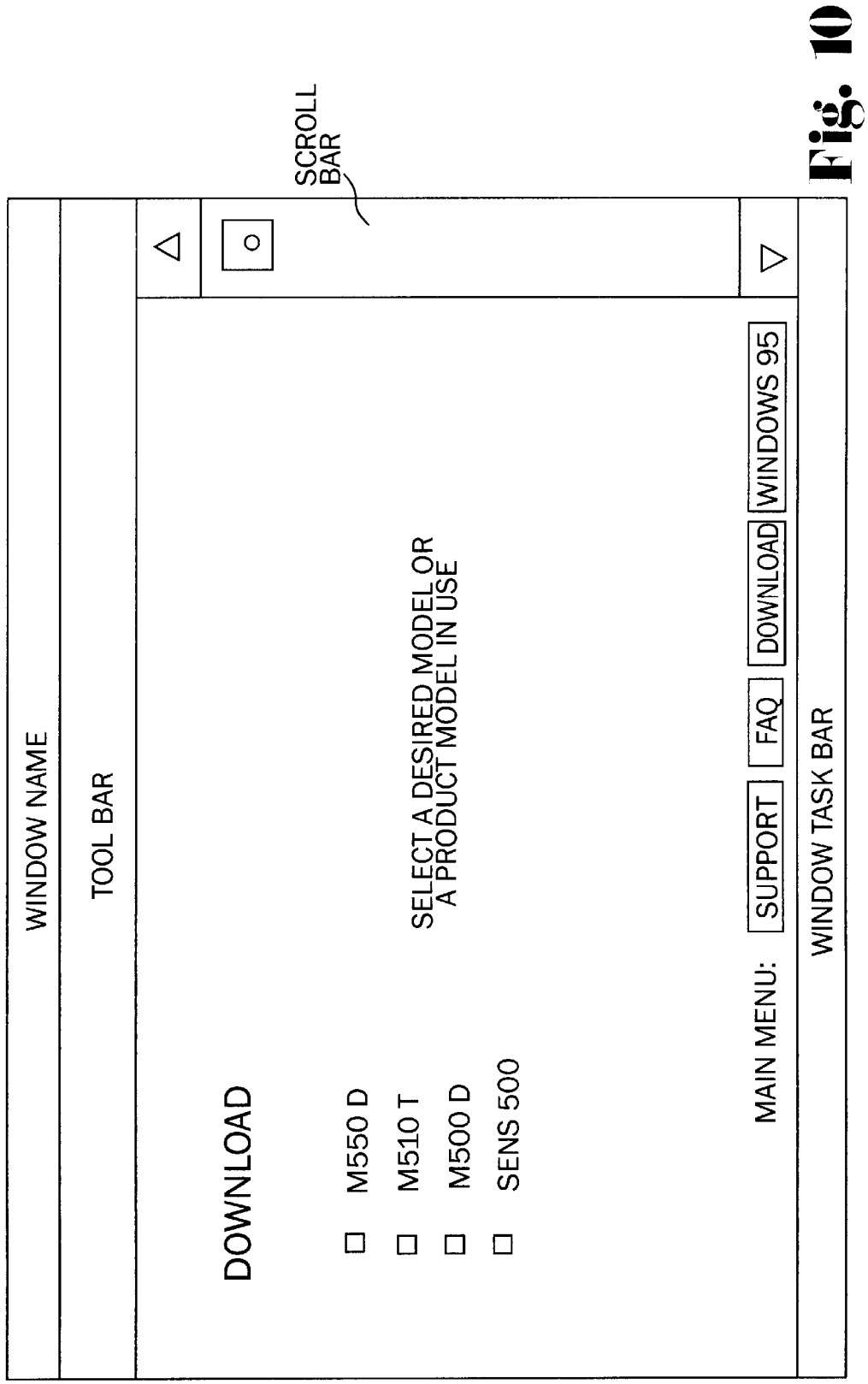
FIG. 10 illustrates a model menu screen for displaying a menu on the model name of a PC which a user currently uses or desires to learn about on the download page.
Figure 11:
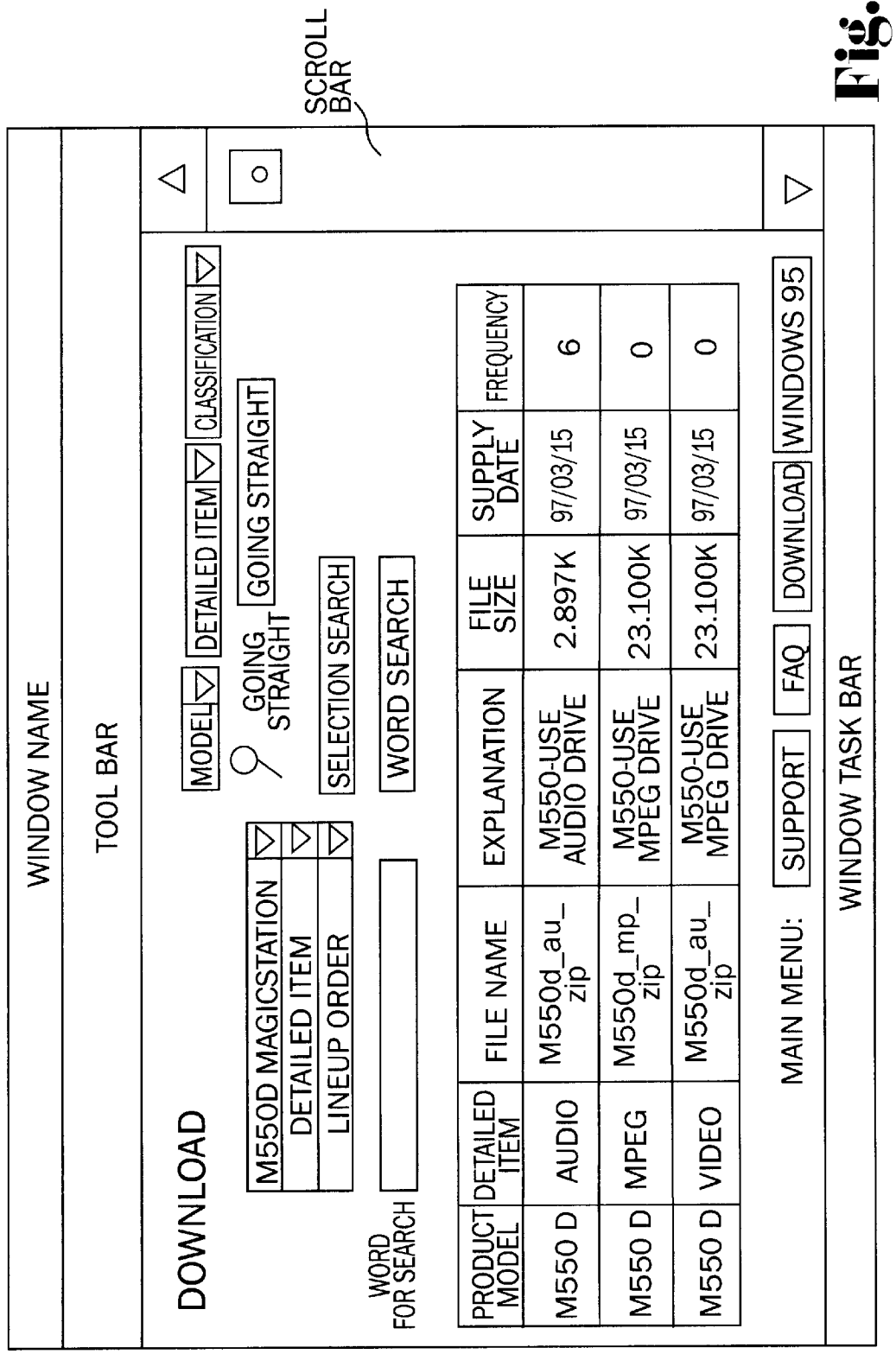
FIG. 11 illustrates a detailed item menu screen for displaying a detailed item menu composed of various drivers and bundle-use software including a variety of utilities required by a selected model.

FIG. 10 shows a model menu screen which is displaying a menu with respect to the model name of a PC which the user is using or desires to learn about on the download page 320. FIG. 11 shows a detailed item menu screen which is displaying a detailed item menu having various utilities, various drivers and bundled software required for a model selected from the model menu screen by the user. A keyword search unit for searching a program to be downloaded through keyword search is further provided when a model is selected from the model menu on the model menu screen as shown in FIG. 11. At this time, the download service unit 326 downloads a program searched by the keyword search unit to a user computer. In addition, the detailed item menu can be realized by a multi-step menu driving scheme as shown in FIG. 11.

Figure 12:
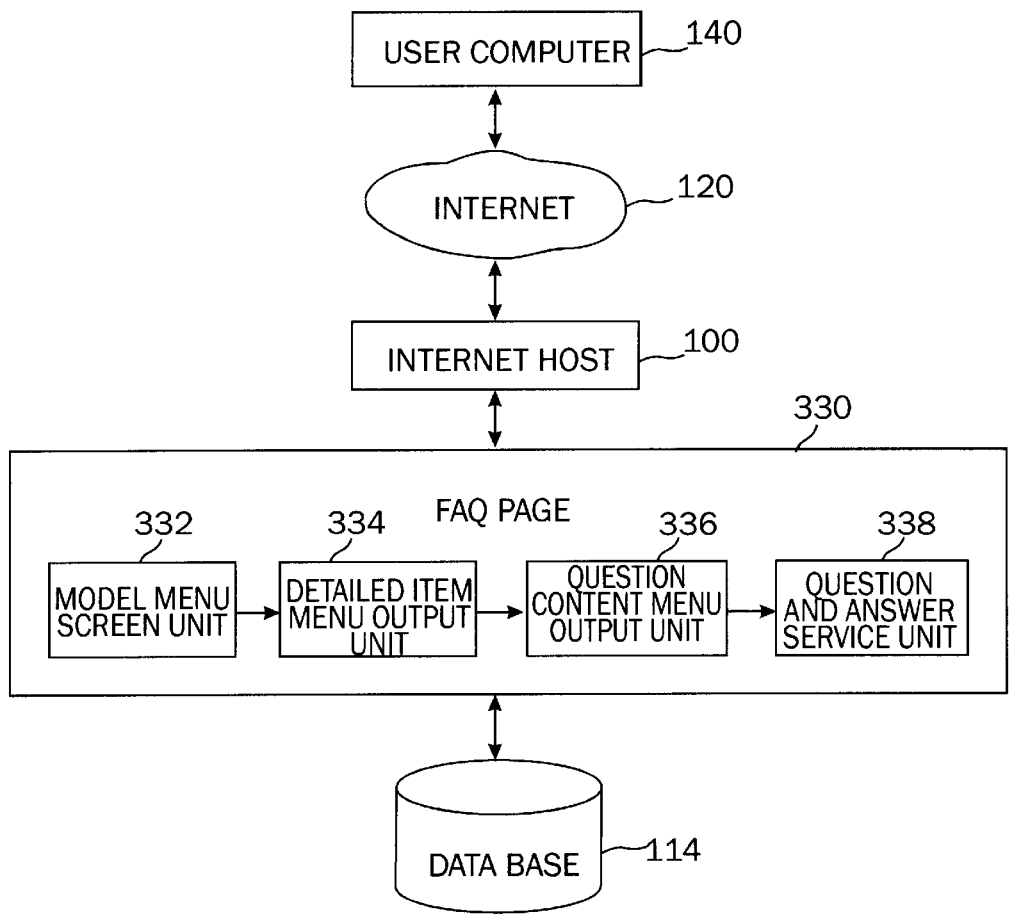
FIG. 12 illustrates a configuration of a FAQ (frequently asked question) page.
Figure 13:
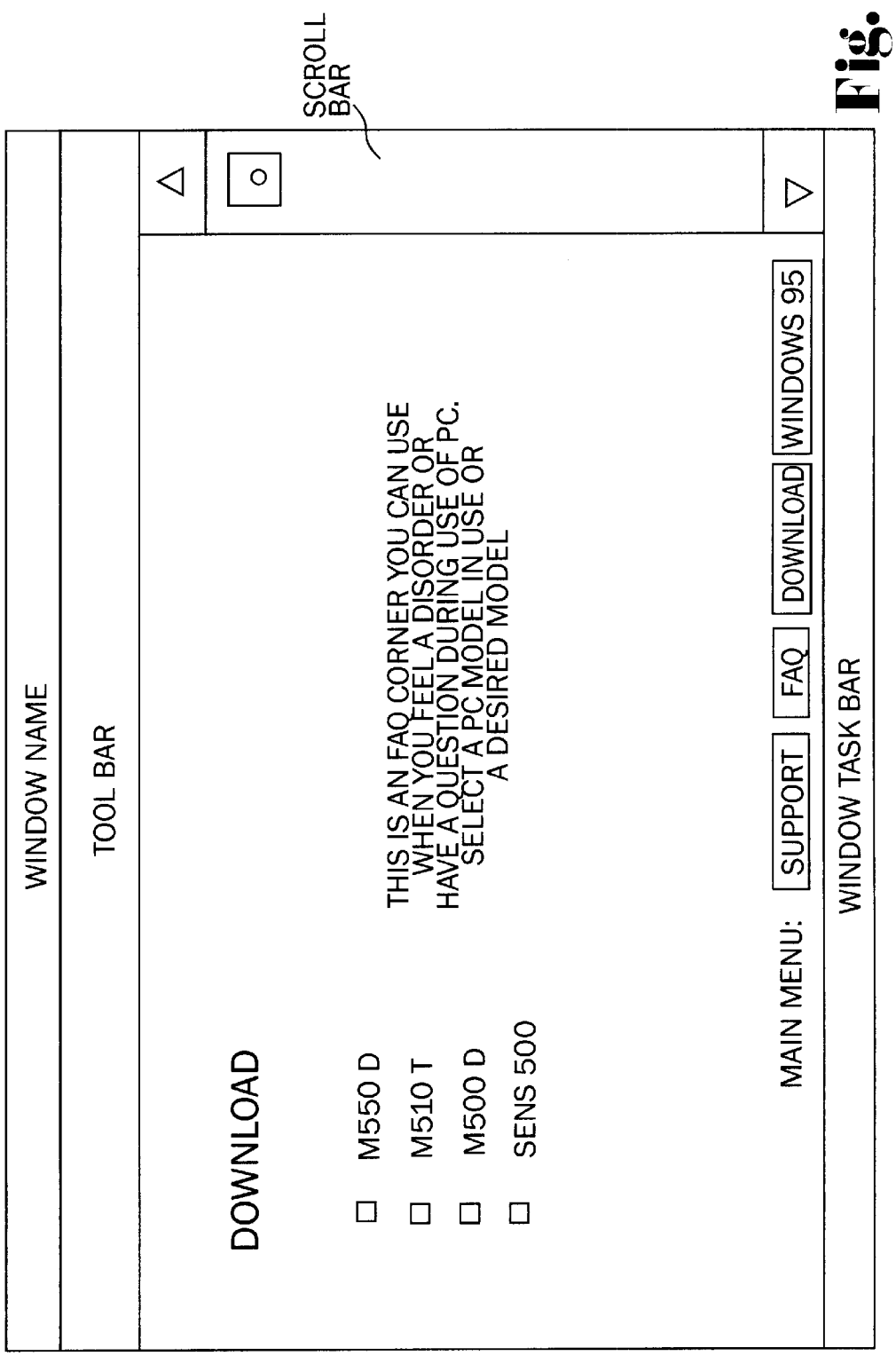
FIG. 13 illustrates a FAQ (frequently asked question) model menu screen for displaying a menu on the model name of a PC which a user currently uses or desires to learn about on the FAQ(frequently asked question) page.
Figure 21:
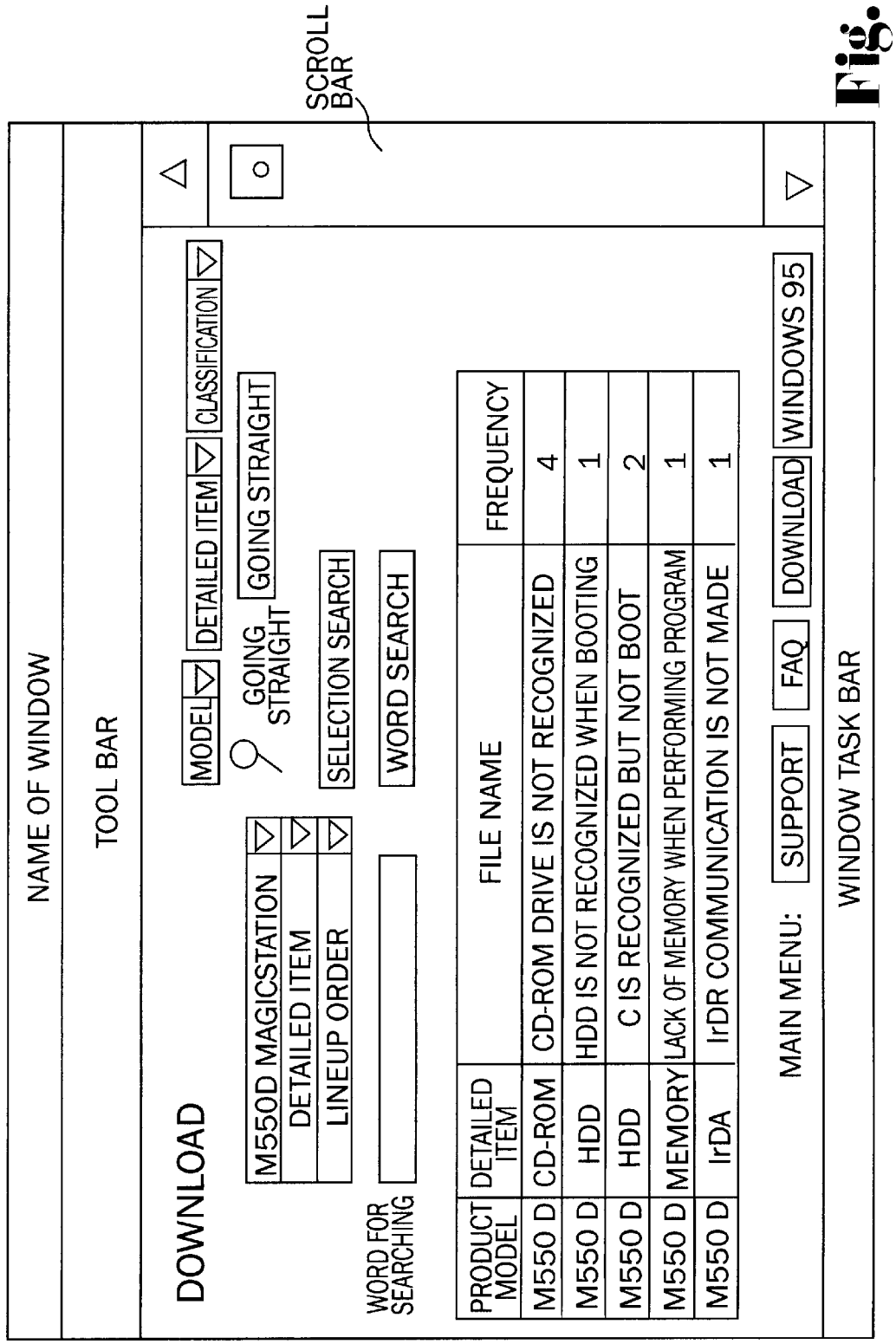

The frequently asked question page (FAQ page) 330 is a module for prewriting answers to most frequent asked questions and for notifying the user of the prewritten answers. As shown in FIG. 12, the FAQ (frequently asked question) page 330 includes a model menu screen unit 332, a detailed item menu output unit 334, an inquiry or question content menu output unit 336, and a question and answer service unit 338. Here, the model menu screen unit 332 provides a model menu from which a product model that the user is using or desires to learn about can be selected. When a model is selected on the model menu screen, the detailed item menu output unit 334 classifies disorders or questions felt or raised by a user during use of a product into detailed items by models, and displays the classified detailed items. When a detailed item is selected from the detailed item menu, the inquiry content menu output unit 336 displays inquiry contents preset with respect to the selected detailed item in a menu system. When an inquiry content is selected from the inquiry content menu, the question and answer service unit 338 provides information on the answer and necessary measures to the selected question. FIG. 13 shows a FAQ model menu screen which is displaying a menu on the model name of a PC which the user is currently using or desires to learn about on the FAQ page 330. FIG. 14 shows a detailed item menu screen which is displaying a detailed item menu where disorders or questions felt or raised by a user while using a model selected by a user on the model menu screen are classified into detailed items. As shown in FIG. 14, when a model is selected on the model menu screen, a keyword search unit for searching the inquiry contents by keyword search is further provided. Then, the question and answer service unit 338 displays the inquiry content corresponding to the keyword to a user computer 140. FIG. 15 shows a screen roughly displaying an example of a question and answer with respect to the selected FAQ (frequently asked question).

The Windows 95 page 340 provides technical information associated with the Microsoft Windows 95 and materials on the usage of Windows 95 to a user. Meanwhile, each of the service pages has a moving menu (going straight) to go from a current service page directly to another service providing page in order to get a desired service.

As described above, the customer support system for providing customer support services using an Internet according to the principles of the present invention advantageously provides high quality support services to customers while reducing the number of after-service requests from customers and the service costs.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A customer support system for providing customer support service with respect to a consumer product using an Internet, said customer support system comprising:

a customer support server including customer support means for providing the customer support service with respect to a consumer product, and a database for storing product-related information to be used by said customer support means; and a user computer including Internet communications means accessible to said customer support server through the Internet for providing access to the product-related information of the consumer product;

said customer support means of said customer support server comprising a gate page, as a homepage of said customer support system, for providing a menu with respect to the customer support service, and a service page section for providing at least the customer support service, including usage guidance on the consumer product, according to a predetermined menu selected on said gate page;

wherein said service page section comprises a download page for downloading, to said user computer, software related to the consumer product; and wherein said download page comprises a model menu screen unit providing a model menu screen enabling a user to select a product model, a detailed item menu output unit displaying a detailed item menu including various utilities, various drivers and bundled software which are required for the product model selected on said model menu screen, and a download service unit for downloading, to the user computer, a program corresponding to a detailed item selected from said detailed item menu.

2. The customer support system of claim 1, wherein said service page section as a service menu provided by said gate page is a support page providing product model guidance, usage of various resources related to the consumer product, and technical information about the consumer product.

3. The customer support system of claim 2, wherein said service page section further comprises a frequently asked question page for providing prewritten answers to most frequently asked questions to the user.

4. The customer support system of claim 3, wherein said frequently asked question page comprises:

a model menu screen unit providing a model menu screen including a product model selected by user;

a detailed item menu output unit providing a detailed item menu classifying disorders and problems experienced by users during use of consumer products into detailed items by models, and displaying said classified detailed items when the product model is selected on said model menu screen;

an inquiry content menu output unit displaying a menu consisting of prepared inquiry contents with respect to a detailed item selected from said detailed item menu; and a question and answer service unit providing information on answers and measures corresponding to a question selected from said inquiry content menu.

5. The customer support system of claim 4, further comprising a keyword search unit enabling searching of inquiry contents through keyword search when the product model is selected on said model menu screen, wherein said inquiry content menu output unit also displays, on the user computer, inquiry contents corresponding to a keyword searched by said keyword search unit.

6. The customer support system of claim 2, wherein said support page comprises:

a model menu screen unit providing a model menu including a product model selected by the user;

a specification screen unit providing a detailed item menu comprising a specification of the product model selected from the model menu screen and various resources related to the selected product model; and a support service unit providing the usage and technical materials with respect to a detailed item selected from said detailed item menu by making access to a database storing information related to said selected product model.

7. The customer support system of claim 6, wherein, when said consumer product is a personal computer, said support service unit includes graphic and text information with respect to front and rear sides of a main body of the selected personal computer, a main board of said selected personal computer, and a switch setting of said selected personal computer.

8. The customer support system of claim 1, wherein said service page section further comprises a frequently asked question page for providing prewritten answers to most frequently asked questions to the user.

9. The customer support system of claim 1, wherein said service page section has a movement menu providing the user with a direct movement between service pages when said service page section comprises at least two service pages.

10. The customer support system of claim 1, wherein said gate page comprises:

a Window name window;

a tool bar window providing a menu where an operation tool with respect to a Window can be selected;

an operation window providing a menu with respect to at least a customer support service;

a screen scroll bar window for scrolling said operation window; and a Window task bar window.

11. The customer support system of claim 1, wherein said detailed item menu is realized by a multi-step menu driving method.

12. The customer support system of claim 1, further comprising a keyword search unit enabling searching of a program to be downloaded through keyword search after the product model is selected on said model menu screen, wherein said download service unit also downloads, to the user computer, the program searched by said keyword search unit.

13. A customer support system for providing customer support service with respect to a consumer product using an Internet, said customer support system comprising:

an Internet host;

a customer support server containing customer support means for providing the customer support service with respect to a consumer product via said Internet host, and a database for storing product-related information to be used by said customer support engine; and a user computer including an Internet communications device for accessing said customer support server through the Internet to obtain the product-related information of the consumer product;

said customer support means of said customer support server including customer support software producing:

a gate page serving as a homepage of said customer support system, and providing a menu with respect to the customer support service;

a service page section providing at least the customer support service, and including usage guidance on the consumer product, according to a predetermined menu selected on said gate page;

a download page for downloading, to said user computer, software related to the consumer product; and a frequently asked question (FAQ) page providing answers to most frequently asked questions and notifying the user of said answers via the user computer.

14. The customer support system of claim 13, wherein said service page section has a movement menu accommodating a direct movement between service pages when said service page section comprises at least two service pages.

15. The customer support system of claim 13, wherein said gate page comprises:

a Window name window;

a tool bar window providing a menu where an operation tool with respect to a Window can be selected;

an operation window providing a menu with respect to at least a customer support service;

a screen scroll bar window for scrolling said operation window; and a Window task bar window.

16. The customer support system of claim 13, wherein said download page comprises:

a model menu screen unit providing a model menu screen illustrating a product model that a user can select;

a detailed item menu output unit displaying a detailed item menu including a plurality of utilities, various drivers and bundled software operationally usable with the product model selected on said model menu screen; and a download service unit for downloading, to the user computer, a program corresponding to a detailed item selected from said detailed item menu.

17. The customer support system of claim 13, further comprising a keyword search unit enabling searching of a program to be downloaded through keyword search after the product model is selected on said model menu screen, wherein said download service unit also downloads, to the user computer, the program searched by said keyword search unit.

18. The customer support system of claim 13, wherein said frequently asked question page comprises:

a model menu screen unit providing a model menu screen illustrating a product model selected by the user;

a detailed item menu output unit providing a detailed item menu classifying disorders and problems experienced by users during use of consumer products into detailed items by models, and displaying said classified detailed items when the product model is selected on said model menu screen;

an inquiry content menu output unit displaying a menu consisting of prepared inquiry contents with respect to a detailed item selected from said detailed item menu; and a question and answer service unit providing information on answers and measures corresponding to a question selected from said inquiry content menu.

19. The customer support system of claim 18, further comprising a keyword search unit enabling searching of inquiry contents through keyword search when the product model is selected on said model menu screen, wherein said inquiry content menu output unit also displays, on the user computer, inquiry contents corresponding to a keyword searched by said keyword search unit.

20. A customer support system for providing customer support service with respect to a consumer product using an Internet, said customer support system comprising:

a customer support server including customer support means for providing the customer support service with respect to a consumer product, and a database for storing product-related information to be used by said customer support means; and a user computer including Internet communications means accessible to said customer support server through the Internet for providing access to the product-related information of the consumer product;

said customer support means of said customer support server comprising a gate page, as a homepage of said customer support system, for providing a menu with respect to the customer support service, and a service page section for providing at least the customer support service, including usage guidance on the consumer product, according to a predetermined menu selected on said gate page;

wherein said service page section further comprises a download page for downloading, to said user computer, software related to the consumer product; and wherein said download page comprises a model menu screen unit providing a model menu screen enabling a user to select a product model;

said system further comprising a keyword search unit enabling searching of a program to be downloaded through keyword search after the product model is selected on said model menu screen, wherein said download service unit also downloads, to the user computer, the program searched by said keyword search unit.

21. The customer support system of claim 20, wherein said service page section further comprises a frequently asked question page for providing prewritten answers to most frequently asked questions to the user.

22. The customer support system of claim 20, further comprising a detailed item menu output unit displaying a detailed item menu including various utilities, various drivers and bundled software which are required for the product model selected on said model menu screen;

wherein said detailed item menu is realized by a multi-step menu driving method.

23. A graphical user interface for providing product support service for a consumer product over a communication network, comprising:

a hierarchically arranged plurality of user interface pages including a main user interface page accessible by a consumer through said communication network, said main user interface page having at least a name window portion for displaying a title of said main user interface page, an operation window portion for displaying a main menu having at least one selectable menu item, a tool bar portion for displaying at least one selectable operational tool for operating upon said operation window portion, and a screen scroll bar portion for providing navigation over said operation window portion;

wherein said hierarchically arranged plurality of user interface pages further includes a support service user interface page, said at least one selectable menu item comprising a hypertext link to said support service user interface page, said support service user interface page allowing said consumer to identify said consumer product, and providing at least usage guidance relative to said identified consumer product.

24. The graphical user interface according to claim 23, wherein:

said consumer product comprises a computing device; and wherein said hierarchically arranged plurality of user interface pages further includes a download page for allowing said consumer to download at least one software item related to said computing device, said at least one selectable menu item comprising a hypertext link to said download page.

25. A method of providing product support service for a consumer product over a communication network, comprising the steps of:

providing a graphical user interface comprising a hierarchically arranged plurality of user interface pages including a main user interface page accessible by a consumer though said communication network, said main user interface page having at least a name window portion for displaying a title of said main user interface page, an operation window portion for displaying a main menu having at least one selectable menu item, a tool bar portion for displaying at least one selectable operational tool for operating upon said operation window portion, and a screen scroll bar portion for providing navigation over said operation window portion;

wherein said hierarchically arranged plurality of user interface pages further includes a support service user interface page, said at least one selectable menu item comprising a hypertext link to said support service user interface page, said support service user interface page allowing said consumer to identify said consumer product, and providing at least usage guidance relative to said identified consumer product.

26. The method of providing product support service according to claim 25, wherein:

said consumer product comprises a computing device; and wherein said hierarchically arranged plurality of user interface pages further includes a download page for allowing said consumer to download at least one software item related to said computing device, said at least one selectable menu item comprising a hypertext link to said download page.

27. A computer readable storage medium having stored thereon a set of instructions for implementing a method of providing product support service for a consumer product over a communication network, said set of instructions comprising at least one instruction for:

providing a graphical user interface comprising a hierarchically arranged plurality of user interface pages including a main user interface page accessible by a consumer through said communication network, said main user interface page having at least a name window portion for displaying a title of said main user interface page, an operation window portion for displaying a main menu having at least one selectable menu item, a tool bar portion for displaying at least one selectable operational tool for operating upon said operation window portion, and a screen scroll bar portion providing navigation over said operation window portion;

wherein said hierarchically arranged plurality of user interface pages further includes a support service user interface page, said at least one selectable menu item comprising a hypertext link to said support service user interface page, said support service user interface page allowing said consumer to identify said consumer product, and providing at least usage guidance relative to said identified consumer product.

28. The computer readable storage medium according to claim 27, wherein:

said consumer product comprises a computing device; and wherein said set of instructions further comprises at least one instruction for providing said hierarchically arranged plurality of user interface pages which further includes a download page for allowing said consumer to download at least one software item related to said computing device, said at least one selectable menu item comprising a hypertext link to said download page.

* * * * *